United States Patent Office 3,156,269
Patented Nov. 10, 1964

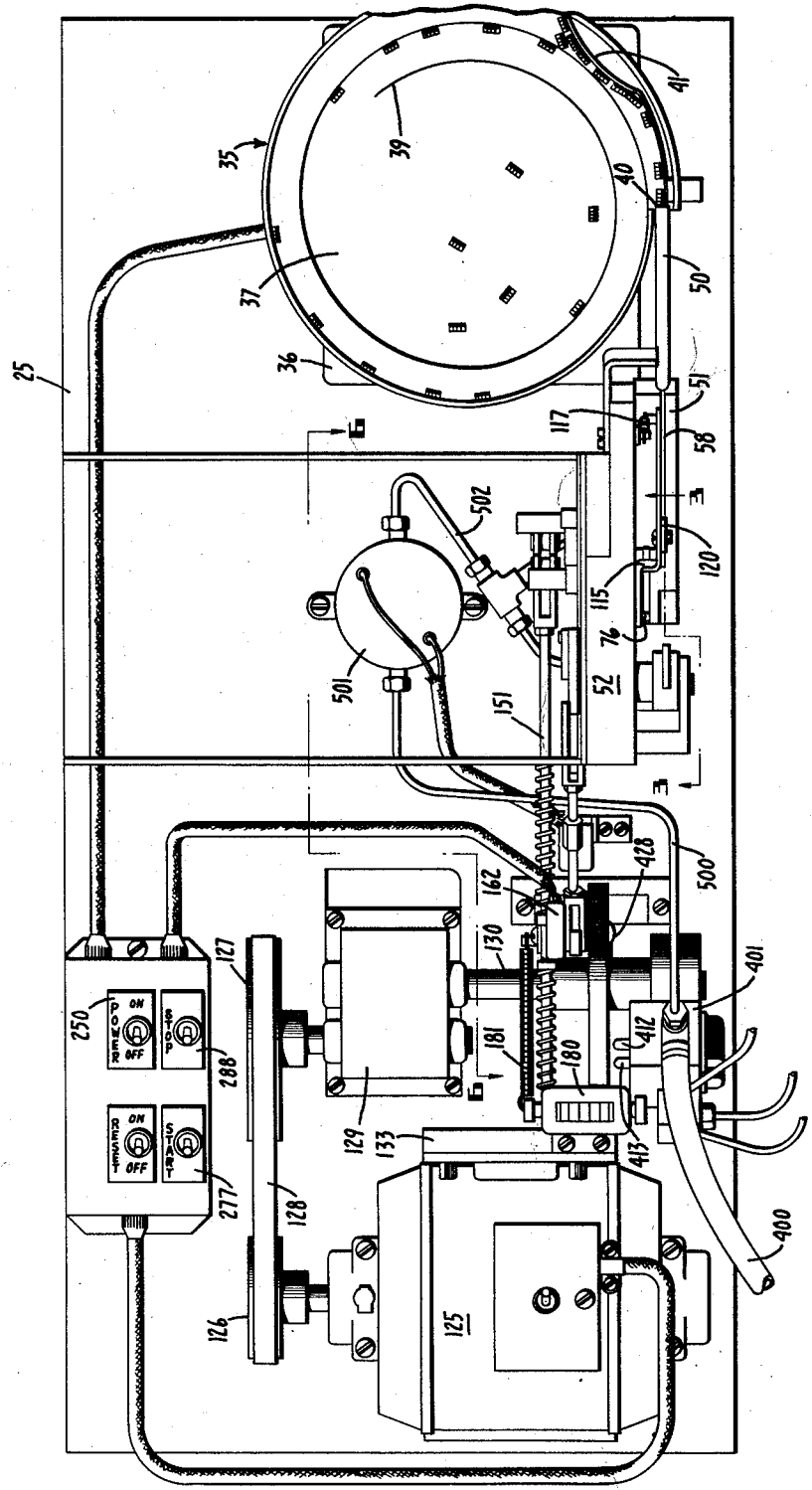

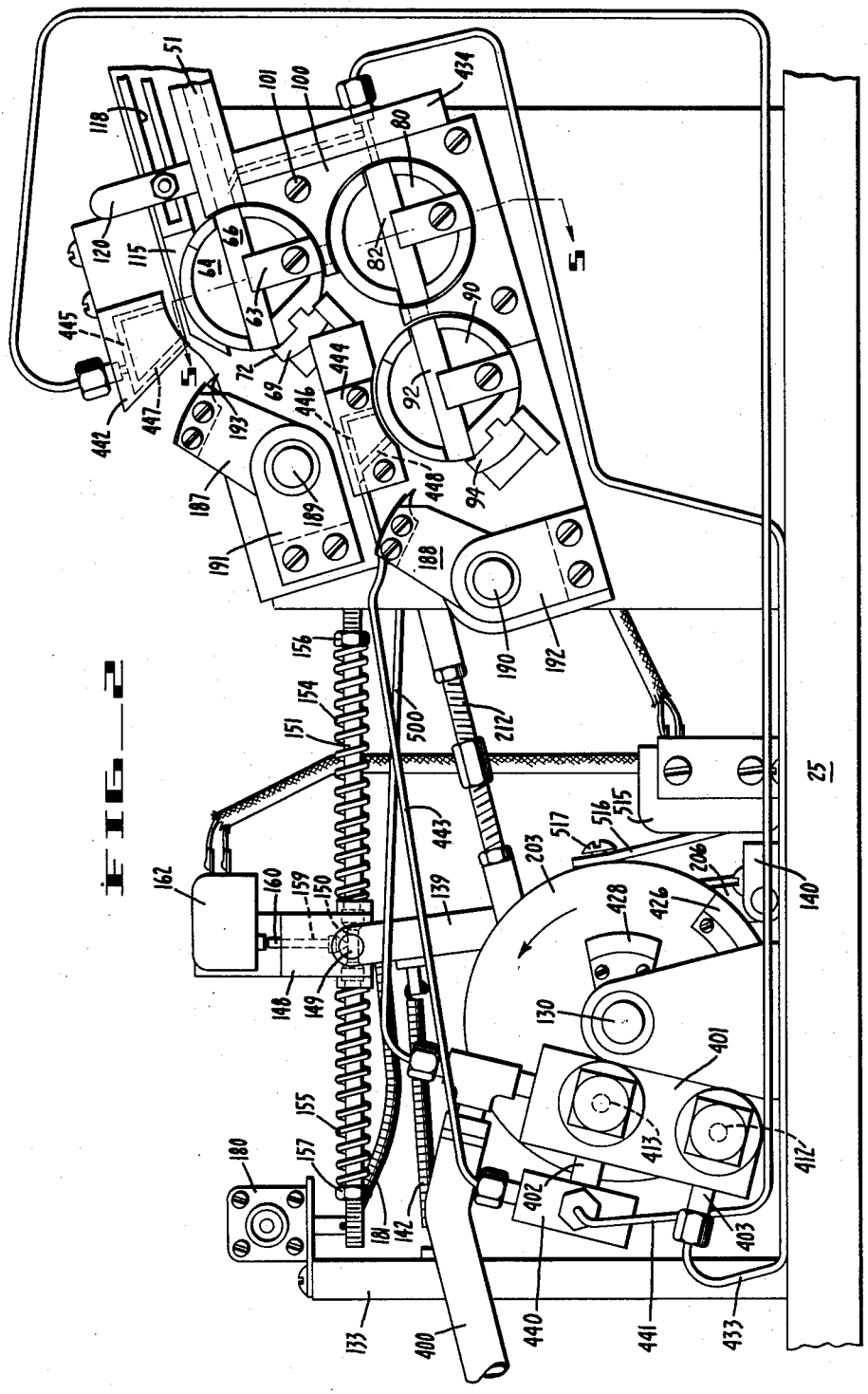

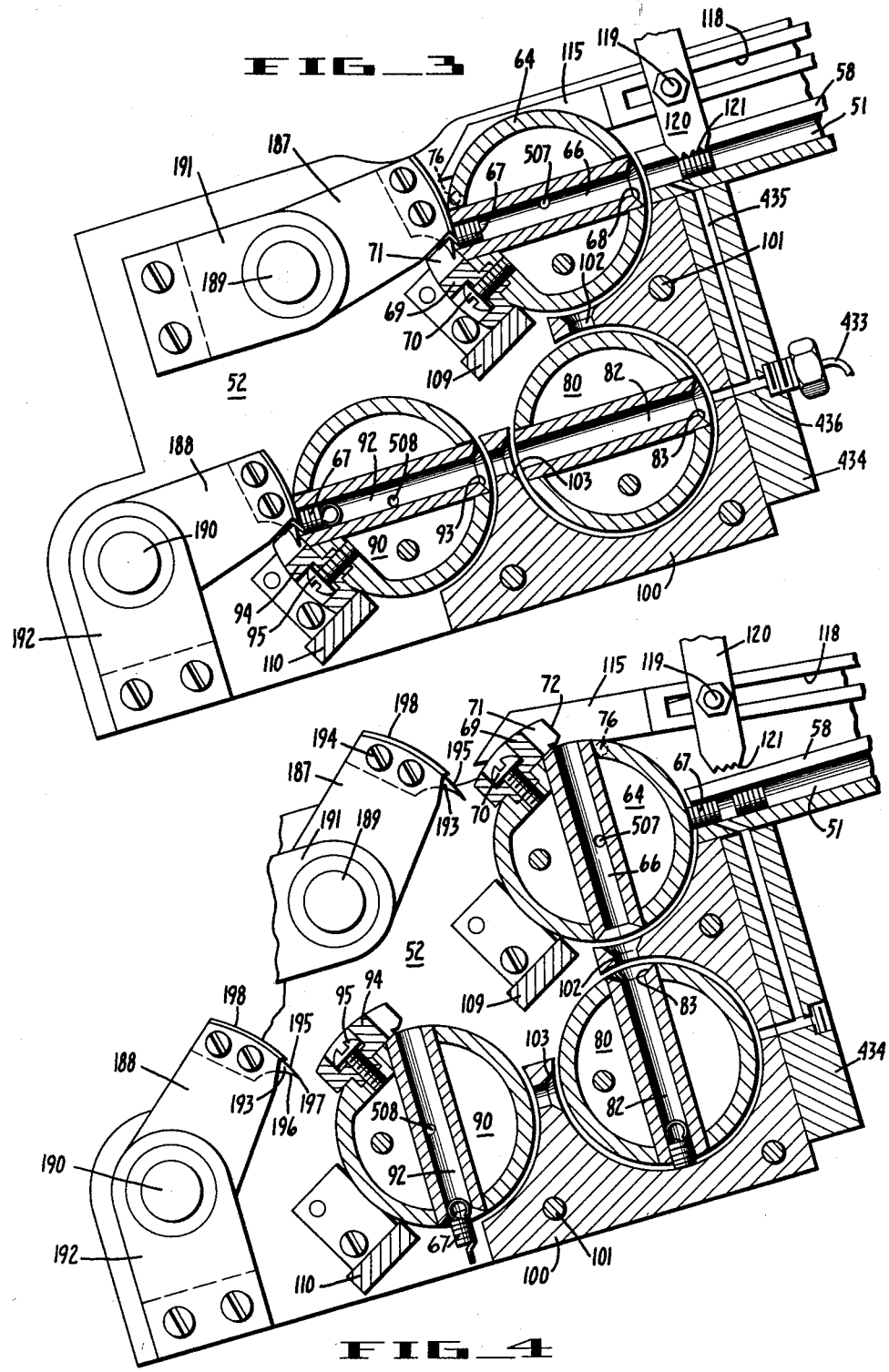

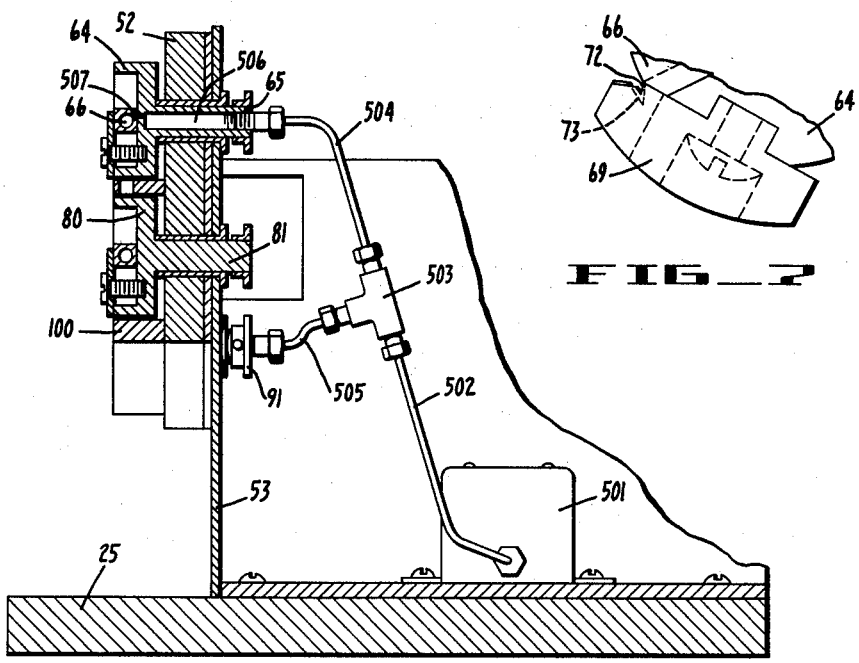
FIG_5
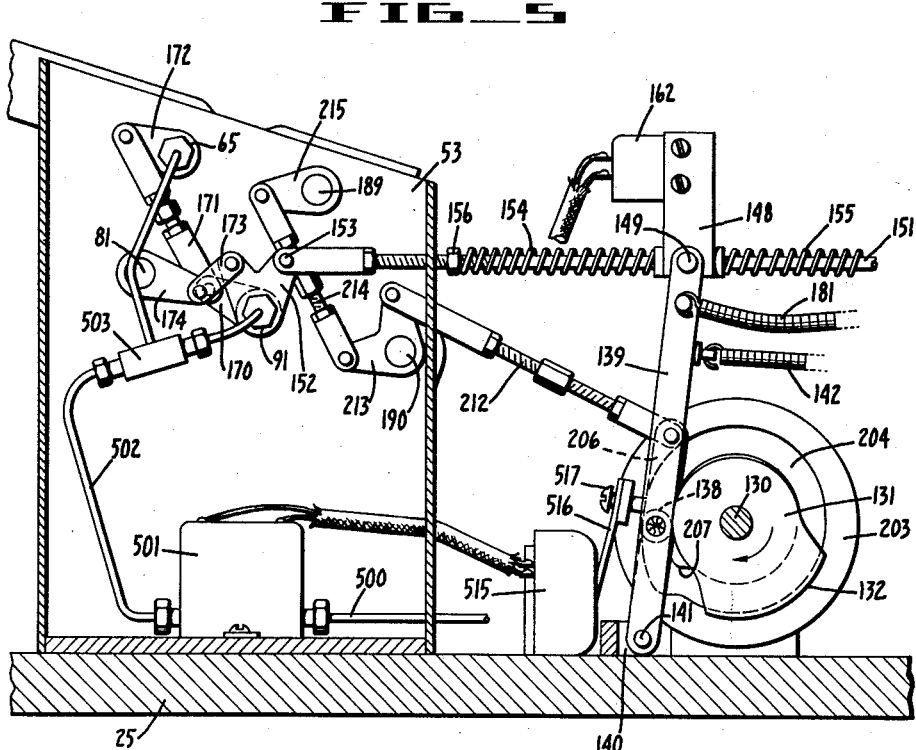
FIG_6

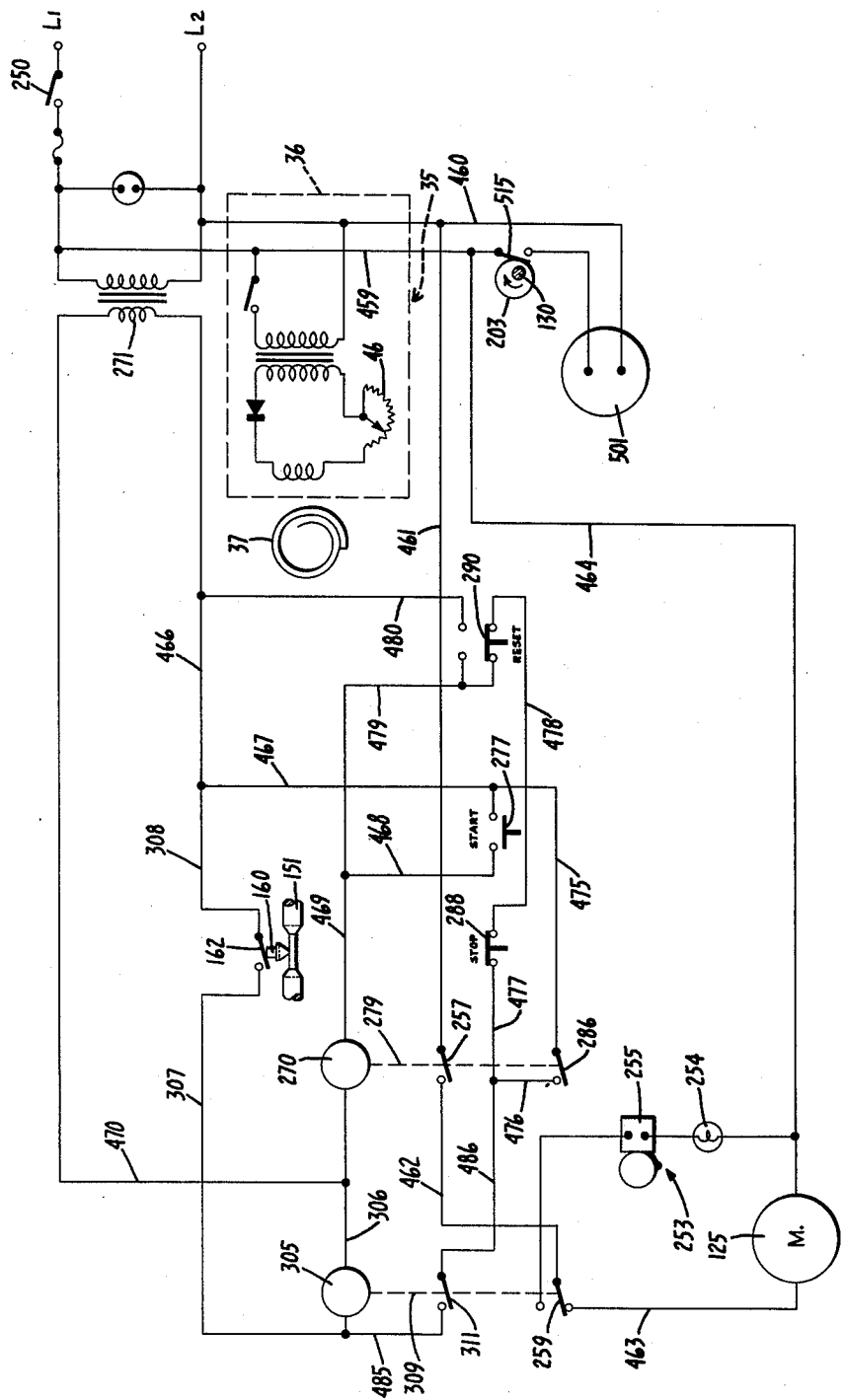

3,156,269
AUTOMATIC SPRING-LOOPING MACHINE
Edwin W. Lehtonen, Castro Valley, Calif., assignor to Friden, Inc., San Leandro, Calif., a corporation of Delaware
Filed Apr. 11, 1960, Ser. No. 21,159
14 Claims. (Cl. 140—103)

This application relates to an invention for an automatic spring-looping machine, by which is meant a machine that automatically forms connecting loops in the end of precoiled springs, and is an improvement over the machine covered by the copending application of Ashley-Wing, filed December 30, 1958, S.N. 785,106, issued as Patent No. 3,040,784, and entitled "Automatic Spring Looping Machine."

The primary object of the present invention is to provide a device suitable for automatically forming accurately sized loops in the ends of coil springs, and particularly those of relatively small size.

In the past it has been necessary, in forming a connecting loop in relatively small springs (such as those of approximately .100" diameter and .125" to .250" length and made of wire of .006" to .010" diameter), often used in office equipment, to form the loops individually and by hand, for, prior to the Ashley-Wing invention abovementioned, there was no commercially practical machine available for automatically and accurately forming these loops.

The present invention is an improvement over that shown in the copending application in that it has a higher speed, is cheaper to fabricate, and provides improved operation in that there is less damage to springs with consequent momentary stopping of the machine to remove the damaged spring. The present invention uses pneumatic pressure to spin the springs in the conduit conducting them to the forming tool, thereby holding the spring gently but firmly against the forming anvil. These connecting loops, in most instances, should be one full circle of the spring wire, no more, and no less. A spring loop of less than a full turn of the spring is likely to slip off of its seat, and the taking of more than one loop takes too much of the spring for loops, thereby changing the force of the spring and sometimes making it difficult to seat them. For example, in certain of the figures of the drawings are shown springs being treated which contain seven turns as they come from the spring-forming machine. If the two end turns are formed as loops, it leaves a spring of five turns. To take an extra turn in one of the loops will make a difference of twenty percent in the contracted length of the spring, with a corresponding difference in its strength and in its limit to which it could be stretched. This particular spring is used in large numbers in one of the leading makes of calculators, and a change of such characteristics in these springs would affect the overall operation of the machine, perhaps to the extent of causing errors. For this reason it has been necessary, in manufacturing small springs, to form the springs on an automatic spring-forming machine, and then take the unlooped springs to the "loopers," i.e., skilled workers who manually, and one at a time, form the loops in the springs by using manual machines. This method is expensive and is hard on the operators, most of whom eventually have trouble with their eyes because of the exactness of the work. One of the primary purposes of the present invention, therefore, is to provide an automatic spring-looping machine which accurately and rapidly, and automatically, forms loops in the ends of springs.

Another primary object of the invention is to provide a pneumatic means for properly positioning a spring in which a loop is to be formed, so that the end loop will be of exact size in all springs. For example, in the illustration shown to exemplify the present invention, the loops will be one complete turn, and no more and no less; but it will be understood that loops of any desired number of turns could be formed equally well.

These and other objects of the present invention will be apparent from the description and claims which follow, and they, in turn, will be more readily understood by reference to the accompanying drawings in which:

FIG. 1 is a plan view of the automatic spring-looping machine of the present invention.

FIG. 2 is a front view of the machine shown in FIG. 1, with the parts in what can be called the "home" or "full-cycle" position.

FIG. 3 is a cross-sectional view, on an enlarged scale, of the turrets of the present invention, showing in particular, the operation of the forming tool by means of which the loop is formed, such as a view taken along the planes indicated by the lines 3—3 of FIG. 1.

FIG. 4 is similar to FIG. 3, but shows the turrets operated through an angle of approximately 90° in order to shift the spring from one turret to another.

FIG. 5 is a transverse, cross-sectional view through the first forming turret and the reversing turret, such as taken along the plane indicated by the line 5—5 of FIG. 2.

FIG. 6 is a rear view of the machine, showing particularly the cams and associated mechanisms which control the operation of the various mechanisms of the machine, and particularly the timing of such mechanisms, such as taken along the planes indicated by the lines 6—6 of FIG. 1.

FIG. 7 is an enlarged detail of the looping anvil associated with the forming turrets.

FIG. 8 is a wiring diagram of the machine of the present invention.

The mechanism of the present invention is mounted on a suitable base plate 25. The basic elements of the machine are mounted upon this base plate 25, these basic elements comprising a vibrating hopper feeder 35 and its controller 36; a pair of forming turrets 64 and 90 and their respective loop-forming tools, or fingers, 187 and 188; a motor 125, a drive mechanism including a gear box 129, a drive shaft 130, cams mounted on the drive shaft, and cam follower linkage operated by the cams and effective to control the operation of the turrets and the loop-forming tools of the present invention; and an air pressure system for spinning the springs as they pass through the turrets to be looped by loop-forming tools.

The vibrator hopper 35 is mounted at one end of the base plate 25 by any suitable means, such as a mounting bracket, not shown. Any one of a number of vibratory hopper feeders could be used, but the one heretofore used with complete satisfaction for a wide range of spring sizes and types, has been the "Syntron" Model EB–00. Such a vibratory hopper feeder is described in the article by Woerner McKinsey, Jr. and John P. Moran in the May 1957 issue of "The Tool Engineer." Such a vibrator hopper broadly comprises an electromagnet, not specifically shown herein, but contained within the casing 36 (FIG. 1) which is mounted upon the base plate 25, preferably by a resilient mounting in order to dampen vibration in the balance of the machine; and a bowl 37 mounted upon the base casing 36 by diagonally inclined leaf spring legs, not shown herein but well-known in the art. The energizing of the electromagnet pulls the bowl downwardly toward it, i.e., toward the casing 36. Movement of the bowl is permitted by the mounting, for the springs will bend from the force of the electromagnet, imparting a rotary, as well as vertical, motion to the hopper bowl 37. The bowl is provided with a spiral ramp 39 leading from the floor of the bowl to a discharge orifice 40. A suitable gate 41 is mounted on the side of the ramp 39, adjacent the discharge orifice 40, in order to limit the feed to the discharge orifice to a single line of items (in this case, springs), each axially aligned with the others. When the feeder is operated by conventional A.C. electric current, the vibratory feeder abovementioned will have a vibration frequency of approximately 3600 v.p.m. The operation of the electromagnet is controlled by a known control mechanism including a half-wave selenium rectifier, not shown, and a rheostat-type switch 46 (FIG. 8) which controls the amplitude of the vibration and hence adjusts the feeder for different sizes of items to be fed, the frequency remaining substantially constant throughout. The high frequency of vibration of the hopper causes the parts to be fed (in this case, springs) to flow up the ramp somewhat like a fluid. The gate 41 forces the springs into a single line of axially aligned springs, and returns all those lying crosswise to the interior of the hopper, as is well-known.

A conduit tube 50 (FIG. 1) leads from the discharge orifice 40 of the hopper. This conduit may be of any suitable material, such as a light metal tube, loosely inserted into the discharge orifice, for there will be relative vibration between this conduit and the hopper. The conduit 50 discharges into a trough 51 secured to a turret mounting plate 52 fastened to the base plate 25 by a mounting bracket 53 (FIG. 5). This trough is substantially an enclosed conduit in order to prevent piling of the springs one upon another, but is provided with a narrow slot 58 (best shown in FIGS. 3 and 4) to enable an adjustable catch to be inserted therein to stop and hold the springs until a feed into the forming turret is necessary.

The mounting plate 52 preferably supports three turrets, as best shown in FIGS. 2 to 4: a first forming turret 64, a reversing turret 80, and a second forming turret 90, all of which are rotatably mounted on the plate. The first forming turret 64, which is the turret to first receive an unlooped spring, is rigidly mounted on a quill shaft 65 (see FIGS. 5 and 6) journalled in the mounting plate. The axis of shaft 65 intersects the extended axis of the circular trough 51 in the full-cycle, or home, position of the turret. This turret 64 is provided with a central bore 66 (see FIGS. 3 and 4), which, in the full-cycle, or home, position of the turret, is axially aligned with the central bore of the circular trough 51. Preferably, the respective bores of the turrets are readily removable so as to permit their changing by an operator to adjust the size of the bore to the size of the spring which is to be looped therein. For this purpose the bore 66 preferably is clamped to turret 64 by a suitable clamp 63. It is seen that a spring 67 passing down of the trough 51 will entered the bore 66 in turret 64. In order to facilitate the entry of a spring 67 into the bore 66, it is preferred that the end adjacent the trough 51 be flared, or chamfered, as shown at 68.

An anvil member 69 is rigidly mounted on the turret 64 by any suitable means, such as a screw stud 70, as shown in FIGS. 3 and 4. This anvil is formed with a central recess 71 which is aligned with the bore 66, the width of the recess preferably being approximately three-fourths of the diameter of the spring to be looped. A pair of shoulders 72 and 73 (see FIG. 7) flank the recess 71, these two shoulders being spaced from the end of the bore 66, as shown, sufficiently to permit one turn of the spring to extend beyond the bore. It can be mentioned that as springs are generally coiled with a clockwise helix, the spacing of the right-hand shoulder 73 (looking along the axis of bore 66 from the inlet end of the bore) is greater than spacing of the left-hand flank shoulder 72. Actually, the left-hand shoulder 72 is normally spaced from the end of the bore 66 a distance equal to approximately one-half the diameter of the wire from which the spring is formed, while the right-hand shoulder 73 is slightly more than the full diameter of the spring wire. It can be mentioned that the air jet to be described hereafter rotates a spring in a clockwise direction as it passes down the bore from the inlet to the anvil, i.e., right to left in FIGS. 2 to 4. When the spring reaches the end of bore 66 and passes therefrom, the end of the spring loop passes between the right-hand shoulder 73 and the wall of the turret, and comes to rest against the side of the left-hand face of the shoulder 72, the latter shoulder being so close to the turret as to prevent rotation of the spring. By this means, there normally will be one full turn, and only one turn, of the spring outside of the bore 66, and the end of that spring will always abut the left-hand shoulder 72. When this position is reached, a loop-forming tool is operated (as will be explained immediately following the description of the remaining two turrets) to form a loop in the spring, as best shown in FIG. 3.

The second, or reversing, turret 80 is rigidly mounted on a shaft 81 (see FIG. 5), likewise journalled in the plate 52, and lying parallel to shaft 65. Preferably the shaft 81 lies below shaft 65 (see FIGS. 2 to 4) in a plane substantially perpendicular to the axis of trough 51, being separated from shaft 65 by a distance slightly in excess of the diameter of the turrets. It can be mentioned at this point that all of the turrets, at the midpoint of a cycle, are rocked through an angle of approximately 90° to rock them from the position shown in FIG. 3 to that shown in FIG. 4. This turret is likewise provided with a central bore 82, which, in the full-cycle, or home, position of the turret, is parallel to the bore 66; and in the half-cycle position, is axially aligned with the bore 66, as shown in FIG. 4. This bore is also flared, as at 83, at its inlet end, to provide ready access of springs from the bore 66.

The third, or second forming, turret 90 is mounted forwardly of the turret 80, and is rigidly mounted on a shaft 91 (FIG. 6) journalled in the mounting plate 52. The axis of this shaft, which is parallel to the other shafts 65 and 81, lies on the axis of the bore 82 of turret 80 when the turrets are in the full-cycle, or home, position. This shaft 91 is likewise spaced from shaft 81 by a distance slightly in excess of the diameter of the turrets. This third turret 90 is provided with a central bore 92, the inlet end of which is flared, as at 93, in order to more readily receive springs passed thereto by the turret 80. The turret 90 is also provided with an anvil 94 mounted on the turret by any suitable means, such as screw stud 95. This anvil is similar in all respects to anvil 69 mounted on the turret 64, and will, therefore, not be described again.

In the preferred form of construction, a solid guide plate 100 is mounted on the mounting plate 52, the guide plate being recessed, as shown in FIGS. 2 to 4, to embrace approximately one-fourth of turret 64, three-fourths of turret 80 and one-fourth of turret 90. This guide plate is mounted on the mounting plate by any suitable means, such as screws 101, as shown. The recesses of this guide plate are so arranged that as the three turrets are rocked from the home, or full-cycle, position shown in FIGS. 2 and 3 to the half-cycle position shown in FIG. 4, the spring 67 is retained in the bore of its respective turret while the turret is turning. Then, when the half-cycle position is reached, the spring is enabled to pass through a suitable guide aperture, such as 102, between turret 64 and turret 80. At the same time, the spring in turret 90 is permitted to drop backwardly out of the bore 92 into some receptacle, not shown. When the turrets return to their home position an unlooped spring is enabled to pass from conduit 51 into bore 66, and the spring dropped from turret 60 into the bore 82 of turret 80 is enabled to pass into turret 90 through a guide aperture 103 between turret 80 and turret 90. It is seen by comparison of FIGS. 3 and 4, that the spring 67 lying in turret 64 in FIG. 3, is reversed when it is received in turret 80, as shown in FIG. 4, so that a spring loop may be formed on the opposite end.

The mounting plate 52 is also provided with a pair of heavy brackets 109 and 110 which are adapted to form a strong stop for the anvils 69 and 94, respectively, when the turrets are in the home position, thereby holding the anvils and the respective turrets in the full-cycle position against the force of the forming tools during the loop-forming operation.

The feed of unlooped, formed springs to the first forming turret is controlled by a feeding mechanism, most completely shown in FIG. 2. This mechanism is operated by a pin 76 (see FIG. 4) on the inner side of the turret 64. When the turret is rocked, this pin engages the forward, or free, end of a feed lever 115 pivotally mounted on the machine by any suitable means, not shown. The lever is resiliently biased into engagement with the pin 76 by any suitable means, such as a spring 117 (FIG. 1). This lever is provided with an elongated slot 118 (FIGS. 2 to 4) which embraces a small bolt 119 adapted to clamp a latch arm 120 onto the lever 115, which is thus adjustable lengthwise of the lever 115. The lower end of this latch lever 120 is provided with a series of teeth 121, as shown in FIGS. 3 and 4, adapted to engage the turns of springs being fed in the machine. This stop arm 120 is so set that one, and only one, spring 67 lies between it and the periphery of the first turret 64, as shown in FIG. 4. In the home position of the turrets, this latching lever is adapted to engage the spring, as shown in FIG. 3, the lower end of the arm lying within the slot 58 formed in the upper part of the trough. When the pin 76 engages the arm 115 (see FIG. 4), the turret has turned so that the bore is no longer aligned with the trough 51 and the spring 67 cannot pass from the trough. In that event, the locking arm 120 is lifted, allowing the springs to slide forwardly, or to the left in these figures, until they are lying, one against another, with the foremost lying against the periphery of the turret 64. Then, as the turrets return to their full-cycle position, the arm is dropped, thereby engaging the second spring, so that when the full-cycle position is reached, only the first spring 67 is permitted to pass into the bore 66 of turret 64.

The means for oscillating, or operating, the turrets 64, 80 and 90 is best shown in FIG. 6. This mechanism is driven by an electric motor 125 (FIG. 1). A pulley 126 on the armature shaft of the motor is connected to a pulley 127 on a gear box 129 by a suitable belt 128. The gear box contains suitable reducing gears to drive an output shaft 130. This output shaft carries two cams: turret operating cam 131, shown in FIG. 6, and forming tool operating cam 203, shown in FIGS. 2 and 6. The turret operating cam 131, as shown in FIG. 6, has a lobe 132 extending approximately one-third of the way around the periphery of the cam, with rather sharp flanks on each end thereof, the balance of the cam being of uniform radius.

The periphery of the cam 131 is engaged by a roller 138 mounted on a cam follower arm 139. The arm is pivotally mounted on a bracket 140 rigidly secured to the base plate, the arm being mounted on any suitable means, such as a shaft 141. This follower arm is biased into engagement with the periphery of the cam 131 by any suitable spring, such as the relatively strong tension spring 142 tensioned between a spring seat on the arm and a complementary spring seat formed on the motor mounting bracket 133 (FIG. 2).

The upper end of the arm is pivotally secured to a switch block 148 (best shown in FIG. 6) by any suitable means, such as a stud 149. This switch block 148 is provided with a longitudinally extending bore 150 (FIG. 2), through which extends an operating bar 151. One end of this operating bar is pivotally connected to a bellcrank 152, shown in FIG. 6, by any suitable means, such as a pin 153. The bellcrank 152 is rigidly mounted on the shaft 91, so that turret 90 is driven directly by the reciprocation of bar 151, which normally follows oscillation of the cam follower arm 139. A pair of springs 154 and 155 are mounted on the operating bar 151, one on each side of the switch block 148. These springs are moderately strong compression springs, each engaging the switch block 148 at the center and engaging respective adjusting nuts 156 and 157, respectively. These adjusting nuts 156 and 157 are so set that they resiliently hold a reduced section of the bar 151, not shown, within the bore and hold the cam follower lever 139 and its roller 138 against the periphery of the cam 131.

A second bore 159 in the block 148 intersects the bore 150 and contains a switch-operating plunger 160 therein. This plunger is resiliently biased into engagement with the operating bar 151 by any suitable means, such as a compression spring, not shown. In the event a spring becomes jammed between one of the turrets and the guide plate 100, the back-pressure on operating bar 151 will cause the spring 154 to compress as the operation of the cam positively pushes follower arm 139 and the switch block 148 (to the right in FIG. 2 or to the left in FIG. 6). Relative movement between bar 151 and the switch block 148 causes the switch plunger 160 to ride off the reduced portion and upon the enlarged portion of the bar 151. When that occurs, the plunger is forced upwardly and makes the contacts of a normally open Micro-Switch 162, thereby stopping the machine, as will hereafter be described in connection with FIG. 8, which relates to the wiring diagram of the present invention.

It will be seen by reference to FIG. 6 that the bellcrank 152, which is rigidly mounted on shaft 91, is also connected by a suitable linkage to the other turret shafts 65 and 81. The linkage which connects shaft 91 to shaft 65 may comprise an arm 170 rigidly mounted on shaft 91, the outer end of which is pivotally connected to an adjustable link 171. The other end of this link is pivotally connected to an arm 172 rigidly secured to shaft 65. Hence, the two shafts 91 and 65 rotate in unison, and in the same direction. The bellcrank 152 is connected to the shaft 81 through a linkage which comprises a link 173 pivotally connected to the other arm of bellcrank 152, the other end of the link being pivotally mounted on an arm 174 which is rigidly mounted on the end of shaft 81. This linkage provides means whereby the shaft 81, and hence turret 80, is rotated in a direction opposite to that of shafts 65 and 91, but in unison with the other two.

Normally, it will be desired to have a count of the springs looped in the looping machine, and this can readily be secured by means of a conventional counter 180 (FIGS. 1 and 2), which may be of any convenient design, preferably one of the well-known Veeder-Root counters. This counter can be mounted on the motor mounting bracket 133 and operated by a loose spring 181 connected to the arm 139 and the counting arm of the counter. Thus the oscillation of the arm 139 will operate the counter 180 to count the number of cycles of machine operation, and hence the number of springs looped by the machine.

The loops are formed in the springs by means of a pair of looping, or forming, tools 187 and 188 (FIGS. 2, 3 and 4) associated with the forming turrets 64 and 90, respectively. The looping tools are rigidly mounted on respective shafts 189 and 190 journalled in bearings in the mounting plate 52 and in brackets 191 and 192, respectively. The looping tools are identical in shape and hence only one need be described. Each forming tool preferably comprises a pair of arms rigidly mounted on the respective shafts 189 and 190. The outer end of each tool mounts a loop-forming nose 193, as best shown in FIG. 4, rigidly secured between the two arms by any suitable means, such as screws 194. The width of the loop-forming nose is almost that of the recess 71 of the respective anvil, so that it substantially fills the recess but can enter the recess without engaging the shoulders 72 and 73. The outer edge of the forming tool nose is convex, as shown at 195, having a radius circumscribed about the axis of the shaft on which it is mounted substantially, but not quite, the distance between the axis of that shaft and the outer periphery of the associated turret. A deforming plate 198 is mounted on the outer face of the nose, extending laterally over, and slightly beyond, the adjacent arms, which plate has a forwardly projecting shoulder extending ahead of the sides of the arms, as shown. This shoulder is important in forming a sharp bend between the loop and the adjacent coil, so that the loop extends axially of the coiled spring and perpendicular to the adjacent coil. Incidentally, the shafts 189 and 190 preferably lie in the axis of the bores 66 or 92, respectively, of the turret with which the looping tool is associated, so that when the turrets are in their home position and the looping tools are in their operated position shown in FIG. 3, the convex edges 195 of the loopers will engage the edges of the respective bores. The inner edge of the looper nose 193, at its forward end, is formed as a concave surface 196, the two surfaces 195 and 196 intersecting in a very sharply pointed nose 197. When the turret is in its full-cycle position, as is seen in FIG. 3, and the looping tools 187 or 188 are operated, the sharply pointed nose 197 enters between the coils of the spring, between the first and second turn as shown in these figures. In this situation, the convex face 195 bears against the second turn of the spring and prevents any movement of the spring forwardly in its bore. Simultaneously, the concave face 196 bears against the inside of the first turn and bends it downwardly against the associated anvil 69 or 94, respectively, to form a loop consisting of the first turn of the spring, and only the first turn. It can be mentioned at this point, that the rotational air jets to be described hereafter can be operating at the time the forming tool engages the spring to form the loop, and in the preferred construction will be continued until after the tool engages the spring and will be terminated before the tool has finished its stroke.

The two forming tools 187 and 188 are operated in unison, being rocked from the position shown in FIG. 3 to that shown in FIG. 4 by means which will now be described. A second, or tool-operating, cam 203 (FIG. 6) is mounted on shaft 130 adjacent the cam 131. This cam is preferably formed as a face cam with a groove 204 in one face thereof. This groove, as is shown in FIG. 6, is of substantially constant radius through an angle of approximately 300°, with a lobe, or rise, 207 of approximately 60°. A follower roller (not shown because in FIG. 6 it lies directly behind the follower roller 138) rides in the groove, this roller being mounted on a short cam follower arm 206. This arm is rotatably mounted on the shaft 141 adjacent the follower arm 139 already described.

The upper end of the follower arm 206 is pivotally connected to an adjustable link 212, and the link, in turn, is pivotally connected to a bellcrank 213 rigidly mounted on the shaft 190, as shown in FIG. 6. The other arm of the bellcrank 213 is likewise connected to an adjustable link 214, the other end of which is connected to an arm 215 rigidly mounted on the shaft 189. Thus, both shafts 189 and 190, and consequently the looper tools 187 and 188, are rocked (counter-clockwise in FIG. 6 or clockwise in FIGS. 2, 3 and 4) synchronously by means of the cam 203. It perhaps should be noted that FIG. 6 shows the cams and their followers shortly after the forming tools have started their stroke, the stroke being completed (FIG. 3 position) at approximately 170° after the full-cycle, or home position (FIG. 2).

The timing of the operation of the turrets and the forming tools is best shown in FIG. 6, which shows the relative positions of the lobe 132 of cam 131 and lobe 207 of cam 203. In each instance, there is the major portion of each cycle in which the respective turrets and forming tools are in their home positions shown in FIG. 2. During most of this period, the springs will be first fed into their respective bores, then driven forwardly by an air jet and finally spun, or rapidly rotated by a tangential air jet (clockwise when viewed from behind as they pass from right to left in the embodiment shown). Thus the helical springs in turrets 64 and 90 are spun until the end of the first turn lies against the side of shoulder 72 and only one turn is permitted to lie outside of the bore 66 by the spacing of shoulder 73 (FIG. 7) from the periphery of the turret. Then the follower roller on arm 206 engages the lobe 207 of cam groove 204, rocking the follower arm 206 (counter-clockwise in FIG. 6 or clockwise in FIG. 2), thereby rotating the shafts 189 and 190 in the same direction. This rocking, or oscillation, of the shafts 189 and 190 moves the respective forming tools 187 and 188 from the position shown in FIGS. 2 and 4 to that shown in FIG. 3, thereby forming a loop on the spring in the associated turret. Then, as the forming tools return to their home position, the follower roller 138 (FIG. 6) engages the lobe 132 of cam 131. The engagement of roller 138 with lobe 132 rocks the follower arm 139 (counter-clockwise in FIG. 6) to rock the shafts 65 and 91 in the same direction and the shaft 81 in the opposite direction. This causes the turrets 64 and 90 to rock (clockwise from the position shown in FIG. 3 to that shown in FIG. 4), and the turret 80 to rock in the opposite direction (counterclockwise from the position shown in FIG. 3 to that shown in FIG. 4). Then, when the turrets reach the position shown in FIG. 4, a jet of air from an injection manifold 442 (FIG. 2), as will shortly be explained, causes the spring looped in turret 64 to fall backwards out of bore 66, through the aperture 102 in the guide plate, and into bore 82 of turret 80—the spring falling to the end of the bore where it is caught by the guide plate and held within the bore. Simultaneously, a jet of air from an injection manifold 444 causes the completely looped spring in turret 90 to fall backwardly out of the turret into a receptacle, not shown. As the turrets approach the positions shown in FIG. 4, the pin 76 on turret 64 has lifted the feed arm 115, so that catch 120 has released the springs in the trough 51, and thereby enable the springs to feed forwardly until the first one engages the periphery of the turret 64. Then, after a short interval controlled by the length of lobe 132, the turrets are returned to their original position, passing from the position shown in FIG. 4 into that shown in FIG. 3. In this return operation, the turrets 64 and 92 are rocked counterclockwise (in FIG. 4) and turret 80 is rocked clockwise, to return them to the position shown in FIG. 2. With this operation, the feed finger 115 and catch 120 are enabled to drop into the trough 51, whereupon the catch 120 engages the second spring in line to hold it, and all behind it, from entering turret 64. The first spring in the trough is thus freed for passage through bore 66, and it is fed forwardly into that bore by a jet of air introduced through an inlet conduit 435. Simultaneously, with this feed of the spring into bore 66, a similar jet of air into the inlet end of bore 82, as through a conduit 436, has caused the spring passed from turret 64 to turret 80 to be fed forwardly through aperture 103 in the guide plate, into bore 92 of turret 90. This operation is effective to reverse the spring in bore 92 with respect to what it was in bore 66, so that the looped end lies to the rear and the unlooped end lies against the anvil 94. Then, in the second cycle of operation, the forming tools operate as before, moving from the position shown in FIG. 2 to that shown in FIG. 3, thereby forming the first loop on the spring in bore 66 and the second loop on the spring in bore 92. Then, as the looping tools are withdrawn and the turrets oscillated, the spring in bore 92 is dropped, as shown in FIG. 4, into some suitable receptacle, not shown, while that having one loop formed in bore 66 is dropped into turret 80, and the cycle is repeated.

There are also shown in FIG. 2, and to some extent in

FIGS. 3 and 4, means for providing air injection to move the springs through their respective bores 66, 82 and 92. Preferably, the air is not supplied continuously to these bores, but only as momentary jets when the turrets are in their normal, or home, position, in which the springs are fed forwardly toward the anvils, as shown in FIG. 2, and after they have been rotated 90° to the position shown in FIG. 4.

Compressed air is supplied through an air line 400 leading into a control manifold 401 suitably mounted on a bracket, not shown, on the base plate 25, and having two outlet ports 402 and 403. Customarily, the outlet ports 402 and 403 are closed by needle valves, not shown but which are well-known in the art, which close the apertures between the interior chamber of the manifold 401 and the outlet ports. Both of these needle valves have extended stems 412 and 413 (shown in FIG. 1), which extend through the manifold, and are operated by cams to be described in the next two paragraphs. Preferably, the two needle valves are biased to their closed position by suitable springs contained within the manifold.

The valves are operated in timed sequence by cam projections 426 and 428 rigidly mounted on the face of cam 203, the manifold 401 being mounted close to the cam 203 so that the ends of the needle valve stems 412 and 413 are engaged by the projections. One such cam projection 426 is mounted on the cam 203 at a radius to engage the end of the stem 412 of the needle valve serving outlet 403 at approximately the 315° to 345° position of a cycle (measured from the full-cycle position shown in FIG. 2). The other projection 428 is mounted on the cam plate 203 at a radius such as to cause it to engage the end, or the stem, 413 of the needle valve serving outlet 402, and angularly spaced at about the 180° to 240° position of a cycle.

A single air line 433 leads from the manifold outlet port 403 to an injection manifold 434 mounted on the auxiliary plate 100 by any suitable means, such as screws, not shown. This manifold, as shown in FIGS. 3 and 4, has a branched passageway leading from conduit 433, one branch 436 leading to the inlet end of the bore 82 of the turret 80 and the other branch 435 leading upward to discharge into the inlet end of the bore 66 of the turret 64, when the turrets are in their home position shown in FIGS. 2 and 3. Obviously, whenever the projection 426 engages the stem end 412 of the needle valve serving outlet 403, the valve is pushed inwardly, thereby permitting air in the chamber of inlet manifold 401 to flow through the outlet port 403 and air pipe 433 into injection manifold 434. This provides two jets of air, one leading into the inlet end of the bore 66 of turret 64 and the other into the inlet end of bore 82 of turret 80 and thence into the bore 92 of turret 90, so that springs in the respective turrets are pushed through the bores toward the respective forming anvils 69 and 94. This jet occurs as the turrets are returning to their home positions shortly before the end of a cycle (preferably at about the 315° to about the 345° position of cam 203), thereby blowing a spring forwardly in their respective bores and shortly after the time the latch 120 is operated to hold a second spring in the inlet channel 51. This latter jet is particularly effective in the aligned bores 82 and 92 to force the spring looped in turret 64 down toward the anvil 94.

At approximately the midpoint of a cycle, just as the turrets are being rotated 90° to the position shown in FIG. 4, the needle valve 413 serving outlet 402 is operated by the cam projection 428 engaging the end of its stem, thus permitting a jet of air to escape through the outlet port 402. This flow of air is divided in the outlet manifold 440, one line 441 leading to an injection manifold 442, and a second line 443 leading to the injection manifold 444. Both of the manifolds 442 and 444 have divided outlets 445 and 446, respectively, discharging along the axis of the bores 66 and 92 when the turrets are at the end of their stroke, shown in FIG. 4; and 447 and 448, respectively, discharging at an angle therethrough, so as to discharge through the slot in the anvils 69 and 94 at the same time. The outlets 447 and 448 dislodge the looped spring from the respective anvils, while the outlets 445 and 446 direct the stream of air down the bore, so as to push the spring through the respective bores.

Heretofore it has been customary to spin the springs as they passed down the bore by means of vibration of the turret bore, such as that provided by a Syntron vibrator. I have discovered that the looping machine can be operated at from two to three times faster if the springs are rotated by air jets as they pass along their bores. These air jets assist in feeding the springs forwardly toward the anvils, but also, and more important, such jets spin them quite rapidly as they pass through the bore. It has been found that these air inlets can be located so as to discharge along a radius of the bore with good effects, but it is preferred to place the ports into the bores so that they discharge tangentially, as shown in FIGS. 3, 4 and 5. In this connection it should be remembered that when viewed from the right, or behind the springs, the springs should be rotated in a clockwise direction so as to firmly seat the cut end of the spring against the respective anvil. It has been found that when the air is injected tangentially into the bore 66 of the first turret 60 in a clockwise direction, the unlooped spring was rotated in a counter-clockwise direction—which is the direction opposite to that required for the looping operation and opposite to what was expected. Thus in the first turret the tangential injection of air preferably is in a counter-clockwise direction, as shown in these figures, when it is desired to spin the spring in a clockwise direction. On the other hand, in the second forming turret 90, which is handling a spring with a loop formed in the rear end thereof, the air may be injected in the same direction as that in which it is desired to spin the spring, i.e., in a clockwise direction. The means for so injecting the air into the forming turrets will now be explained.

In the preferred form of construction a branch compressed air conduit 500 leads from the air supply 400 adjacent the inlet end of the manifold 401. This air conduit discharges into a solenoid operated air valve 501 (see FIGS. 1, 5 and 6) preferably fastened upon the base plate 25, as shown in FIGS. 5 and 6. A discharge line 502 leads from the valve 501 and is branched, as at 503, into a discharge line 504 leading to turret 64 and a second branch 505 leading to turret 90. These two branch conduits discharge into an interior chamber, or bore, 506 of the quill shafts of the respective turrets 64 and 90. It can be noted that the coupling between the conduit and the interior of the shaft can be an ordinary brass union, for while there is relative motion between the conduit, such as 504 and the shaft 65, this relative motion can take place within the union which connects the two. Small outlet discharge ports 507 and 508 discharge respectively into the bore 66 of turret 64 and bore 92 of turret 90. As heretofore suggested, the inlet port 507 discharging into the bore 66 is located to discharge in a counter-clockwise direction when it is desired to rotate the springs clockwise (when viewed from the rear as in FIG. 5). On the other hand, in turret 90 it is preferred to place the inlet, or injection, port 508 to discharge in a clockwise direction when it is desired to rotate the spring in that direction. In this connection, it can be noted that in the first forming turret 64, better results are secured if the jet orifice is placed close to the rear end of the spring when the ratio between spring diameter and spring length approaches "1:1."

It perhaps should be noted that in the second forming turret 90 the fact that the spring has already been looped at its rear end becomes a factor of considerable importance, particularly with small springs formed of light wire, such as those of a diameter of .006" to about .010", especially when the springs are of a diameter of .100" or less, and a length between .110" and .240". In these very light springs the rear loop serves appreciably to spin the springs as they pass down the bore 92 of turret 90. The effect of this rear loop on the larger springs, such as those formed of wire of .035", a diameter of .255", and of a length of ½" or more is not so pronounced. In this connection it should be noted that in the second forming turret 90 better spinning is secured if the jet orifice is so placed and directed as to hit the formed loop slightly from behind. Such placing of the orifice seems to cause the loop to act somewhat like a propeller to spin the spring.

I have found that this air jet should be started at about the time the loop-forming tools 187 and 188 start their stroke and should be continued until the nose, or pick, of the forming tool has entered between adjacent coils of the spring. It has, therefore, been found convenient to operate the solenoid operated air valve 501 by means of a switch, such as a conventional microswitch 515. Preferably the switch 515 is normally open, in which condition the valve 501 is closed. The switch 515 can be closed by an operating arm 516 which is adapted to be rocked by the movement of the arm 206 which controls the operation of the forming tools. For this purpose an adjusting screw 517 at the end of arm 516 is adjusted to bear against the edge of the arm 206, so that the rocking of this arm from cam 203 is effective to close the switch and hence open the air valve 501 to permit the injection of air into the interior of the respective bores. This injection begins approximately at the time the forming tools start their stroke and continues until the stroke is completed.

It will be obvious that the size of the bores may be adapted for any spring. It has been found that best results are secured when the diameter of the bore is roughly ten to fifteen percent greater than the diameter of the spring. The diameter of the spring is somewhat critical, but it has been found that the diameter of the bore may vary over a considerable range so long as the fit of the spring in the bore is not too tight to permit it to move in the bore, nor so large that the spring may bend appreciably during the looping operation. Length, however, is important when the ratio of spring diameter to its length approaches a value of "1."

Specifically, the machine of the present invention has been used to loop springs of a diameter of .100" and a length of .128". It has been found that with springs of this size it is very important to keep the size of the bore close to the outside diameter of spring, so as to prevent the lengthwise bending of the spring during the looping operation. However, when the same spring diameter of .100" is coupled with a length of .246" the problem is not nearly so critical. It has also been found that the size of the wire is important to the relative size of the spring diameter and the interior diameter of the bore. This invention has been used to loop springs formed of wire of .006" satisfactorily so long as the spring fits rather closely within the bore, while a spring formed of wire of a diameter of .035" is not nearly so critical. Generally speaking, it has been found that the longer the spring the greater the tolerance between spring diameter and loop bore.

It has been found, particularly in springs of smaller diameter and formed of smaller wire, that occasionally a loop may be deformed during the looping phase of the operation, so as to prevent the spring from falling out of the bore as the turrets are rocked. For these smaller diameter springs, it is, therefore, desirable to have a cut-out switch associated with each of the turrets 64 and 90 and operated by a spring lying within the bore. It is believed that such a safety switch need not be shown or described here, for such is not claimed to be new herein.

A wiring diagram for the circuitry of the preferred embodiment of my invention is shown in FIG. 8. Power can be supplied at any suitable voltage, such as 110 volts A.C. through power lines L–1 and L–2. A main switch 250 controls the flow of power to the machine. The motor 125, the feed hopper 35 and the solenoid-operated air valve 501 are connected in parallel with the power lines L–1 and L–2 through suitable conductors 459 and 460. One terminal of the motor 125 is connected to conductor 460 by a conductor 461, normally open switch 257, conductor 462, normally closed switch 259 and conductor 463. The other motor terminal is connected to line 459 directly by a conductor 464. The cam-operated switch 515 (operated by cam 203 on drive shaft 130) controls the flow of power to the solenoid operated air valve 501, as previously explained.

The control circuits for the control switches preferably are operated at a low voltage and hence are supplied with power through a suitable transformer 271 connected between the power lines L–1 and L–2. A starting circuit, which controls the operation of normally open switch 257, is controlled by a normally open starting switch 277 that is manually operated by the operator. This switch is connected to one side of the transformer 271 by conductors 466 and 467. The switch is connected to a low voltage relay 270, the armature 279 of which controls the positioning of switch 257 by suitable conductors 468 and 469. The other side of the relay 270 is connected to the other side of the transformer by a suitable conductor 470.

The operation of the relay 270 closes a holding circuit, for normally the starting switch is immediately released by the operator. The holding circuit is controlled by a normally open switch 286 mounted on the armature 279 of the relay 270, so that the closing of the starting switch 277 and the operation of relay 270 closes this switch. This switch is connected by means of a conductor 475 to conductor 467, and by means of conductors 476, 477, normally closed stop switch 288, conductor 478, normally closed resetting switch 290 and conductor 479, to the conductor 469 leading into the relay 270. Obviously the holding circuit can be broken by the manual operation of the stop switch 288, which breaks the holding circuit and therefore de-energizes relay 270 and causes the motor control switch 257 to be opened.

The resetting switch 290 is a double-throw switch normally biased to close the holding circuit, but subject to manual operation to close a resetting circuit, including the conductor 480 leading from conductor 466 through switch 290, and hence through conductors 479, 469 to the relay 270. This circuit, of course, in operable only so long as the switch 290 is held in its resetting position, and when released, cuts the flow of power to the relay 270, so that the relay becomes de-energized and switch 257 opens.

The control circuit also includes means for automatically terminating operation of the machine by the automatic cutout switch 162, previously described, this switch being operated by the plunger 160. This switch is connected by means of conductor 308 to the transformer power line 466. A conductor 307 leads from this switch to a second relay 305, thence by a conductor 306 to conductor 470. The armature 309 of the relay 305 is normally biased to hold the motor switch 259, which, incidentally, is a double-throw switch, to close the circuit to the motor. However, the operation of the relay 305 opens the circuit to the motor and closes a warning circuit 253 through switch 259, the warning circuit including a bell 255 and a light 254 and thence back to the source of power. This warning circuit, of course, remains operative so long as the holding circuit for relay 270 remains unbroken, i.e., until the operator opens normally closed stop switch 288 to break the holding circuit.

A momentary operation of the switch 162 is effective to establish a holding circuit for relay 305. The armature of the relay 305 includes a normally open switch 311, one side of which is connected to a conductor 485, which, in turn, is connected to conductor 307, while the other side of the switch is connected by a conductor 486 to conductor 476. The closing of switch 311 hence holds the two relays 270 and 305 energized through the holding circuit, which includes conductors 466, 467 and 475, switch 286 and conductor 476—one branch of this holding circuit including conductor 486, switch 311, conductor 485, and relay 305, while the other branch includes conductor 477, stop switch 288, conductor 478, reset switch 290 and conductors 479 and 459 to hold relay 270 energized.

It will be understood that the machine shown and described herein is a preferred embodiment of my invention, and that the mechanisms shown are capable of considerable modification by a person skilled in the art without departing from the spirit or scope of this invention. It is to be understood, therefore, that the invention is not limited to the details above-described, but may comprehend such other mechanisms, or arrangement of details, or features, as may be consistent with the claims. In view of the prior art, either arrangement shown is capable of considerable modification by a person skilled in the art and any such modifications as are in keeping with the description of claims which follow, are considered to be within the present invention.

I claim:

1. A spring-looping machine comprising a conduit for feeding axially aligned coil springs, means for delivering unlooped coil springs into an inlet end of said conduit, an air jet discharging tangentially into said conduit in one direction for rotating said springs while passing through said conduit, means at the other end of said conduit for holding a spring rotating in said conduit in the contrary direction in a particular angular position and against rotation and simultaneously allow a predetermined number of turns of said spring to extend beyond said conduit, a loop-forming tool operative transversely of the axis of said spring to form a loop therein, and means for operating said loop-forming tool.

2. In a spring-looping machine having a substantially enclosed conduit having an inlet adapted to receive axially aligned coil springs at one end and an anvil at the other end, said anvil having a shoulder adapted to engage the end of a turn of said coil spring rotating in a selected direction and thereby hold the spring against rotation and simultaneously allow a predetermined number of turns of said spring to extend beyond said conduit, a loop-forming tool operative transversely of the axis of said spring to form a loop therein, and means for operating said forming tool, means for rotating said spring in said selected direction comprising a restricted orifice discharging tangentially into said conduit in the contrary direction, and means for supplying air under pressure to said orifice.

3. In a spring-looping machine having a conduit for receiving unlooped coil springs in axial alignment, a hopper for feeding coil springs to an inlet end of said conduit, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop-forming tool operative transversely of the axis of said spring to form a loop therein, and means for operating said forming tool, a means for spinning a spring in said conduit in a selected direction to cause such spring to abut against the said shoulder of said anvil comprising a restricted orifice discharging tangentially in the contrary direction into said conduit and means for supplying air under pressure to said conduit.

4. In a spring-looping machine having a conduit for receiving unlooped coil springs, means for injecting a single coil spring into an inlet end of said conduit, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop-forming tool operative transversely of the axis of said spring to form a loop therein, and means for operating said forming tool, a means for spinning a spring in said conduit in a selected direction to cause such spring to abut against the said shoulder of said anvil comprising a restricted orifice discharging tangentially in the contrary direction into said conduit, means for supplying air under pressure to said orifice, a valve in said air supply and means for operating said valve in timed relationship to the operation of said loop-forming tool.

5. In a spring-looping machine having a conduit for receiving unlooped coil springs in axial alignment, means for injecting a single coil spring into an inlet end of said conduit, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop-forming tool operative transversely of the axis of said spring to form a loop therein, and means for operating said forming tool, a means for spinning a spring in said conduit in a selected direction to cause such spring to abut against the said shoulder of said anvil comprising a restricted orifice discharging tangentially in the contrary direction into said conduit, means for supplying air under pressure to said conduit behind a spring in said conduit, a valve in said air supply, and means for operating said valve to inject air into said conduit after the injection of a spring thereinto and until operation of the said loop-forming tool.

6. A spring-looping machine comprising a hopper for delivering axially aligned and unlooped coil springs, a substantially enclosed conduit having an inlet adapted to receive axially aligned coil springs from said hopper, means for delivering springs from said hopper into said conduit, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop-forming tool operative transversely of the axis of a spring in said anvil to form a loop therein, a second conduit, an anvil at the discharge end of said conduit, said anvil having a shoulder adapted to engage the end of a turn of said coil spring and thereby hold the spring against rotation and simultaneously allow a predetermined number of turns of said spring to extend beyond said conduit, a second loop-forming tool operative transversely of the axis of a spring in said second anvil to form a loop therein, drive means for operating both of said loop-forming tools, means for passing a spring from said first anvil to said second anvil, and means for reversing said springs during said passage, a means for rotating a spring in said conduits in a selected direction to cause such spring to abut against the said shoulders of said anvils comprising a restricted orifice in said first conduit discharging tangentially in the contrary direction, a restricted orifice in said second conduit discharging tangentially in the selected direction, a compressed air supply for said orifices, a valve in said air supply, and means for operating said valve in timed relationship to the operation of said drive means.

7. A spring-looping machine including a conduit for conducting unlooped and axially aligned coil springs, means for delivering axially aligned coil springs to an inlet end of said conduit, means for rotating said springs in a selected direction while passing through said conduit comprising a restricted orifice discharging tangentially into said conduit in the contrary direction and an intermittently operated compressed air supply, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop-forming tool operative transversely of the axis of a spring in said conduit to form a loop therein, means for operating said forming tool, and means for operating said air supply in timed relationship to the operation of said forming tool.

8. A spring-looping machine comprising a conduit for conducting unlooped and axially aligned coil springs, means for delivering axially aligned coil springs to an inlet end of said conduit, an air injection means discharging tangentially into said conduit in one direction for rotating said springs while passing through said conduit, an anvil at the other end of said conduit, said anvil having a shoulder adapted to engage the end of a turn of said coil spring turning in the opposite direction and thereby hold the spring against rotation and simultaneously allow a predetermined number of turns of said spring to extend beyond said conduit, a loop-forming tool operative transversely of the axis of a spring in said conduit to form a loop therein, means for operating said forming tool, a second air injection means discharging axially into the inlet end of said conduit, a pressurized air supply for both said injection means, and means operated in timed relationship to the operation of the forming tool for sequentially injecting air into said second air injection means and then into said first air injection means.

9. In a spring-looping machine having an anvil for holding a spring therein in a particular angular position and against rotation in a selected direction, a conduit for feeding axially aligned coil springs to said anvil, means for delivering unlooped coil springs into an inlet end of said conduit, said anvil and said conduit being so spaced one from another as to allow a predetermined number of turns of said spring to extend beyond said conduit to engage said anvil, a loop-forming tool operative transversely of the axis of a spring in said conduit and engaging said anvil to form a loop therein, and means for operating said loop-forming tool, a means for rotating a spring in the selected direction in said conduit to abut said anvil comprising a restricted orifice discharging tangentially into said conduit in the opposite direction, and means for supplying air under pressure to said orifice in timed relationship to the operation of said loop-forming tool.

10. A spring-looping machine comprising a conduit for conducting axially aligned coil springs, means for delivering axially aligned coil springs to an inlet end of said conduit, an air jet discharging tangentially in one direction into said conduit for rotating said springs while passing through said conduit, a loop-forming anvil for receiving springs from the other end of said conduit, said anvil having a shoulder adapted to engage the end of a turn of a coil spring rotating in the reverse direction and thereby hold the spring against rotation and simultaneously allow a predetermined number of turns of said spring to extend beyond said conduit, a loop-forming tool operative transversely of the axis of said spring to form a loop therein, and means for operating said forming tool.

11. A spring-looping machine comprising an anvil having a shoulder adapted to engage the end of a turn of a coil spring rotating in a selected direction and thereby hold the spring against rotation, a substantially enclosed conduit having an inlet adapted to receive axially aligned coil springs at one end and to deliver them to the anvil at the other end, said anvil and said conduit being so spaced from one another as to allow a predetermined number of turns of a spring to extend beyond said conduit to engage said anvil, a loop-forming tool operative transversely of the axis of a spring in said conduit and engaging said anvil to form a loop therein, means for operating said forming tool, a restricted orifice discharging tangentially into said conduit in the opposite direction, and means for supplying air under pressure to said orifice.

12. In a spring-looping machine having a loop-forming anvil adapted to engage the end of a turn of a coil spring and thereby hold the spring against rotation, a conduit for receiving axially aligned unlooped coil springs for delivery to said anvil, the outlet end of said conduit being so spaced from said anvil as to allow a predetermined number of turns of said spring to extend beyond said conduit to engage said anvil, a hopper for feeding coil springs to an inlet end of said conduit, a loop-forming tool operative transversely of the axis of a spring in said conduit and engaging said anvil to form a loop therein, and means for operating said forming tool, a means for spinning a spring in said conduit in a selected direction to cause such spring to engage said anvil comprising a restricted orifice discharging tangentially in the contrary direction into said conduit and means for supplying air under pressure to said conduit.

13. In an apparatus for bending the terminal turn of a coil spring to form a loop at the end thereof, the combination comprising a forming anvil adapted to engage the cut end of a coil spring rotating in a selected direction, a cylindrical tubulation for receiving said spring, means positioning said tubulation with a first end thereof adjacent said anvil, a compressed air source connected to provide an air jet discharging tangentially within said tubulation in the opposite direction and a pick element having a terminal point, which pick is movable across said first end of said tubulation whereby said point pries said terminal turn from said spring and bends said turn towards said anvil.

14. In an apparatus for bending the terminal turns of coil springs to form fastening loops thereon, the combination comprising a forming anvil having an edge defined by intersecting first and second faces, the first of said faces forming means for engaging the end of a coil spring and the second of said faces forming a shoulder on the first face adapted to engage the end of the terminal turn of said coil spring when the spring is rotated in a selected direction, a cylinder for receiving said springs, means for positioning a first end of said cylinder adjacent said first face of said anvil, a compressed air conduit discharging tangentially into said cylinder in the opposite direction whereby said springs are driven against said first face of said anvil and are rotated to abut the end of said terminal turn against said shoulder, and a pick assembly having a terminal point movable across said first end of said cylinder and towards said anvil to pry said terminal turn from said spring and bend the same against said anvil.

References Cited by the Examiner
UNITED STATES PATENTS

| 1,051,497 | 1/13 | Harter | 140—103 |
| 2,701,545 | 2/55 | Scherer | 302—2 XR |
| 2,748,450 | 6/56 | Flaws et al. | 29—25.19 XR |
| 2,815,519 | 12/57 | Friedman | 302—2 XR |

CHARLES W. LANHAM, Primary Examiner.

RICHARD A. WAHL, WILLIAM F. PURDY, WHITMORE A. WILTZ, Examiners.